Patented Mar. 4, 1947

2,416,818

UNITED STATES PATENT OFFICE 2,416,818

MANUFACTURE OF ALKALINE EARTH SULPHONATES

John C. Carter, Concord, Calif., assignor to Tide Water Associated Oil Company, San Francisco, Calif., a corporation of Delaware No Drawing. Application February 26, 1944, Serial No. 524,067

6 Claims. (Cl. 260—504)

This invention relates to the manufacture of calcium and other alkaline earth metal sulphonates from alkali metal sulphonates, particularly those derived from petroleum mahogany sulphonic acids; and has as its principal object a simple method of preparing such sulphonates in relatively pure form.

In the treatment of mineral oils with concentrated or fuming sulphuric acids, either for the purpose of purifying the mineral oil or for the specific purpose of producing sulphonic acids, there are formed substantial amounts of oil-soluble sulphonic acids which remain dissolved in the unreacted portion of the mineral oil. These are known to the trade as "mahogany" acids or as "mahogany sulphonic acids." According to general practice these are removed from the unreacted mineral oil by treatment with an aqueous caustic soda solution, usually of about 5° Bé. strength, or with a dilute aqueous solution of other caustic alkali, whereby the mahogany acids are converted to the corresponding alkali soaps which dissolve in the aqueous solution. Upon separation of the aqueous layer from the mineral oil, the alkali metal soaps may be recovered from the aqueous solution by the addition of sufficient strong caustic solution (40°–50° Bé.) to "salt out" the soaps. The soaps so recovered, after removal of excess water by heating, may contain from 50% to 75% of hydrocarbon oil as well as minor amounts of water and other impurities.

Sodium sulphonates so recovered, either in the crude form or after purification, have found considerable use as detergents and emulsifiers. However, there is a growing demand for alkaline earth metal mahogany sulphonates, particularly those of calcium. These are used for various purposes including emulsifiers, wetting agents, surface tension depressants, and as additives for improved lubricating oils.

The conversion of the sodium sulphonate to calcium sulphonate presents many difficulties. Although comparatively pure calcium sulphonate may be prepared by first converting the sodium sulphonate to free sulphonic acids and then neutralizing the free acids with lime, such procedure is rather involved and, consequently, attempts have been made to make the conversion directly. Due to the high emulsifying power of sulphonic acid soaps the usual method of converting a sodium soap to a calcium soap, namely by double decomposition with an aqueous solution of a calcium salt such as calcium chloride, has proven unsatisfactory in practice and attempts to use this method generally result in the formation of stubborn emulsions of soap, water, and the hydrocarbon oil present and any product which may be obtained by this method will be highly contaminated. The substitution of lime for the calcium salt has been found to give better results, but the product obtained usually contains large quantities of sodium salts and unreacted sodium sulphonate, and the sodium content will usually be more than 25% of the total metal content of the product.

Although such impure calcium sulphonate is satisfactory for some purposes, the presence of large amounts of sodium sulphonate is detrimental for other purposes. This is particularly true when the calcium sulphonate is to be used as an additive for lubricating oils for internal combustion engines, in which application the sodium sulphonate has a tendency to be unstable during operation under heavy duty conditions.

The present invention provides a method whereby sodium sulphonate may be readily converted into calcium sulphonate with minimum troubles from emulsions during the conversion and whereby the resulting product is relatively free from unreacted sodium sulphonate.

To this end sodium sulphonate obtained from caustic soda treatment of acid treated petroleum oil, or other suitable sodium sulphonate which will yield a water-insoluble calcium sulphonate, is treated at a temperature above about 240° F. (preferably above 250° F.) with a concentrated aqueous solution of calcium chloride. The concentration of the calcium chloride in the solution should be sufficient to raise the boiling point of the solution above the reaction temperature and thus permit the required temperature to be maintained without excessive boiling. As a 35% aqueous solution of calcium chloride boils at about 240° F., the original concentration and amount of the calcium chloride solution introduced in the reaction should be sufficient that, after consumption of calcium chloride by the formation of calcium sulphonate, the concentration will still be at least about 35%. For example, if 100 pounds of a given sodium sulphonate react with 10 pounds of calcium chloride in the formation of calcium sulphonate, this sodium sulphonate may be treated with 110 pounds of aqueous solution containing 45 pounds of calcium chloride and 65 pounds of water, so that, as the reaction nears completion the aqueous layer will still contain a ratio of 35 pounds of calcium chloride to 65 pounds of water. Alternately, the same sodium sulphonate may be treated with 50 pounds of aqueous solution containing 24 pounds of calcium chloride and 26 pounds of water whereby, at the completion of the reaction, the solution will contain 14 pounds of calcium chloride and 26 pounds of water, a ratio of 35:65.

Preferably, larger quantities of calcium chloride than shown in the above two examples are used and the strength and quantity of the calcium chloride solution is so chosen as to permit a reaction temperature of at least 250° F., which corresponds to the boiling point of a 42% aqueous calcium chloride solution remaining at the end of the reaction. As the excess calcium chloride remaining after the reaction may readily be used in the treatment of subsequent batches of sodium sulphonate, and accordingly does not represent an economic loss, it is advantageous to employ a substantial excess above the minima indicated above. It has been found convenient, and conclusive of good results, to start with approximately 50% solution of calcium chloride (i. e. one part of $CaCl_2$ to one part of $H_2O$) and to use from one to two parts by weight of this solution for each part of sodium sulphonate to be converted.

The temperature of 240° F. is quite critical and below this temperature the reaction is slow and generally incomplete with great tendency toward emulsification while above 240° F., and particularly at 250° F. and above, the reaction takes place readily and within a relatively short time the calcium sulphonate is formed which separates from the mixture as a clear upper layer with only a small intermediate layer of emulsion. Generally this emulsion, being of only small amount, may be discarded as it is probably composed largely of water-soluble sulphonates which are undesired. The sodium chloride formed by the double decomposition of the sodium sulphonate will be practically insoluble in the concentrated calcium chloride solution and will settle to the bottom. After separation, the calcium chloride solution, if desired, may be used subsequently for treating additional sodium sulphonate by adding sufficient dry calcium chloride to bring the solution to the required concentration.

The invention may be better understood from the following example wherein sodium sulphonate obtained from the caustic soda neutralization of acid treated transformer oil was converted to calcium sulphonate:

*Example*

One thousand pounds of cold water were run into a 1000-gallon grease kettle. The agitator was started and one thousand pounds of anhydrous calcium chloride were added. The heat of solution raised the temperature to 145° F. After complete solution of the calcium chloride the temperature was raised to 205° F. and two thousand pounds of crude sodium sulphonate (analyzing approximately 50% sodium sulphonate and 50% hydrocarbon oil) were mixed in. The viscosity of this soap was in the range of 1000–2000 S. U. at 100° F. The temperature was then raised in thirty minutes to incipient boiling, which was readily apparent by the foam-head which rose slowly off the liquid surface when the agitator was stopped. The foam-head appeared at 250° F., and was dispersed by starting the agitator. Mixing was continued at this temperature for one hour, at the end of which agitation was stopped and the kettle was allowed to settle for eighteen hours at 210°–230° F. To drain off the lower aqueous salt layer, the valve was opened full for about two minutes to sweep out the bottom of the kettle. About fifty gallons were so run off. Then the run-off was regulated to about ten gallons per minute. Presently the clear aqueous liquid was followed by a "milky" liquid for fifteen minutes. A thick brown interface followed for four minutes containing precipitated sodium chloride. When the dark brown oily liquid of the calcium sulphonate appeared several gallons were run off. The kettle was permitted to settle another three hours, after which several gallons containing suspended inorganic salts were drained off and discarded. After further settling to remove suspended solid matter there was obtained a yield of 1,712 pounds of calcium sulphonate, or 85.6 per cent, calculated on original weight of sodium sulphonate, which had the following composition:

| | Per cent |
|---|---|
| Calcium sulphonate | About 50 |
| Hydrocarbon oil | About 50 |
| Ash as $SO_4$ | 5.41 |
| Ca | 1.55 |
| Na | 0.03 |
| $Fe_2O_3$ | 0.08 |

In the above example the invention was satisfactorily carried out by batch operation in a conventional grease kettle equipped with a stirrer. Other equipment of similar or dissimilar construction may be used, or a countercurrent apparatus may be used, if desired, wherein the sulphonate and salt solution are passed countercurrently, at the proper temperature, through a contactor equipped with baffles or other mixing devices.

While the invention has been described above in reference to the use of calcium chloride for the production of calcium sulphonate, certain other salts of the alkaline earth metals, calcium, strontium, and barium have the characteristics of calcium chloride including sufficiently high solubilities in water to permit the attaining of the necessary boiling point for the required reaction temperature. This has been particularly noted in the case of strontium chloride, which in approximately saturated aqueous solution gave satisfactory conversion of sodium sulphonate to strontium sulphonate. All such salts, for the purposes of the invention and for the scope of the appended claims, are to be regarded as the full equivalents of calcium chloride when proper allowance is made for their different boiling points at various concentrations.

Likewise, potassium and other alkali metal sulphonates are to be regarded as the equivalent of sodium sulphonate.

As is well known, "sulphonic acids" derived from petroleum and certain other hydrocarbons are mixtures of a large number of sulphonic acids. In the above description and in the appended claims the term "sulphonate," in singular form, is intended to include soaps of such mixtures of sulphonic acids. This is in accordance with the manner in which this term is generally used in the trade. Likewise, the term "mahogany sulphonate" is intended to indicate soaps of mahogany sulphonic acids.

I claim:

1. A process of preparing calcium sulphonate which comprises: reacting sodium mahogany sulphonate with a highly concentrated aqueous solution of calcium chloride at a temperature above 240° F. and separating calcium sulphonate from the reaction mixture.

2. A process of preparing calcium sulphonate which comprises: contacting sodium mahogany sulphonate with a highly concentrated aqueous solution of calcium chloride at a temperature above about 240° F. and for sufficient time to cause said sulphonate to react therewith forming calcium sulphonate, maintaining during the reaction the boiling point of said solution at least as high as the reaction temperature, permitting calcium sulphonate formed in the reaction to separate from the reaction mixture, and withdrawing the separated calcium sulphonate.

3. A process of preparing calcium sulphonate which comprises: contacting sodium mahogany sulphonate with an aqueous solution of calcium chloride containing sufficient calcium chloride in excess of 35 parts of calcium chloride per 65 parts of water to react with all said sulphonate, maintaining the mixture at a temperature of incipient boiling of said solution for a sufficient time to convert substantially all of said sulphonate to calcium sulphonate, then permitting said calcium sulphonate to separate from the mixture, and withdrawing the separated calcium sulphonate.

4. In a process wherein a crude sodium sulphonate derived from the caustic soda treatment of a sulphuric acid treated petroleum oil is reacted with calcium chloride whereby calcium sulphonate and sodium chloride are formed, the improvement which comprises: reacting said sodium sulphonate at a temperature above about 240° F. with an aqueous solution containing 65 parts by weight of water and X plus Y parts by weight of calcium chloride, where X is at least 35 and Y is the stoichiometrical amount of calcium chloride required to react with the sodium sulphonate treated.

5. In a process wherein a crude sodium sulphonate derived from the caustic soda treatment of a sulphuric acid treated petroleum oil is reacted with calcium chloride whereby calcium sulphonate and sodium chloride are formed, the improvement which comprises: reacting said sodium sulphonate at a temperature above about 240° F. with from one to two parts by weight, based on the weight of sodium sulphonate treated, of an approximately 50% solution of calcium chloride.

6. The process of converting sulphonates which comprises: heating a mixture of alkali metal sulphonate derived from petroleum oil-soluble sulphonic acids and a concentrated aqueous solution of alkaline earth metal salt having a boiling point above about 240° F. to a reaction temperature above about 240° F., below the steady boiling point of said solution but above the degree at which substantial emulsification occurs, to form alkaline earth metal sulphonate and alkali metal salt, and recovering the thus formed sulphonate.

JOHN C. CARTER.

REFERENCES CITED

The following references are of record in the file of this patent:

UNITED STATES PATENTS

| Number | Name | Date |
|---|---|---|
| 1,303,779 | Divine | May 13, 1919 |
| 2,304,230 | Archibald | Dec. 8, 1942 |
| 1,947,652 | Langedijk | Feb. 20, 1934 |
| 1,438,101 | Divine | Dec. 5, 1922 |
| 624,028 | Helmers | May 2, 1899 |
| 1,706,940 | Shestakoff | Mar. 26, 1929 |
| 2,036,469 | Field | Apr. 7, 1936 |
| 2,286,725 | Goodloe | June 16, 1942 |
| 2,361,476 | Higbee | Oct. 31, 1944 |
| 2,361,804 | Wilson | Oct. 31, 1944 |